May 28, 1968  E. R. EVANS  3,385,340
LOCK FASTENER
Filed April 22, 1966  2 Sheets-Sheet 1

INVENTOR.
EDWIN R. EVANS DECD.
BY THE DETROIT BANK AND
TRUST COMPANY EXECUTOR

Whittemore, Hulbert & Belknap
ATTORNEYS

May 28, 1968     E. R. EVANS     3,385,340
LOCK FASTENER
Filed April 22, 1966     2 Sheets-Sheet 2
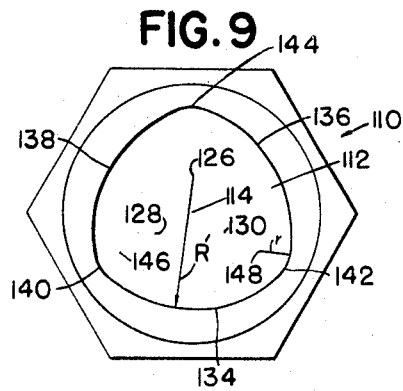
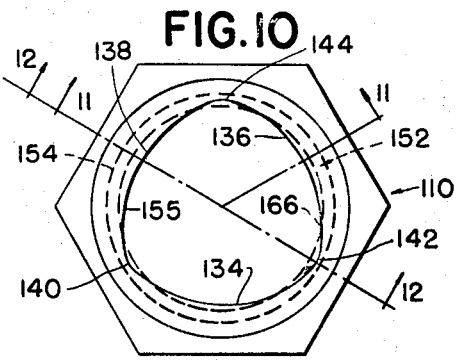
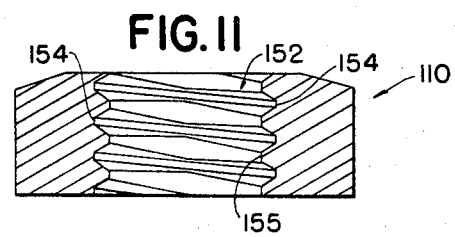
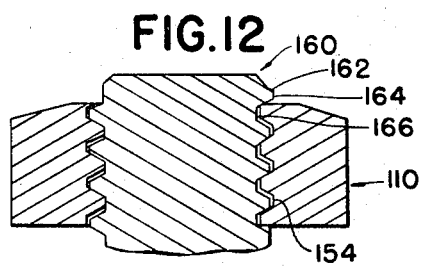
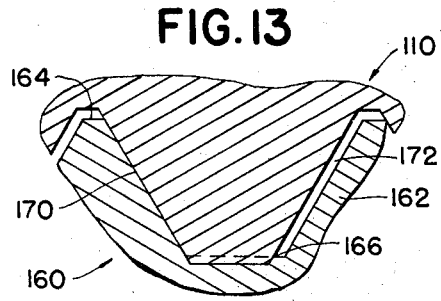
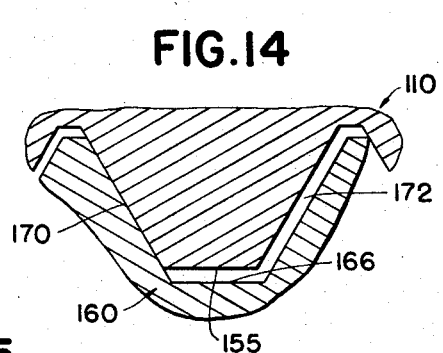
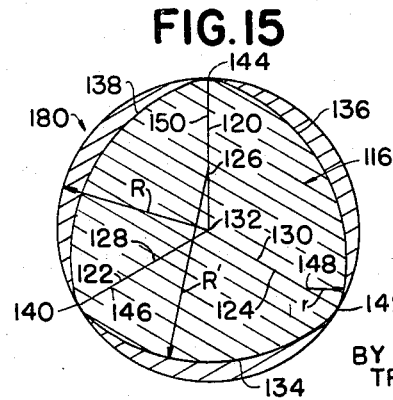
*INVENTOR.*
EDWIN R. EVANS DECD.
BY THE DETROIT BANK AND
TRUST COMPANY EXECUTOR
*Whittemore, Hulbert & Belknap*
ATTORNEYS

United States Patent Office 3,385,340
Patented May 28, 1968

3,385,340
LOCK FASTENER
Edwin R. Evans, deceased, late of Orchard Lake, Mich., by The Detroit Bank and Trust Co., executor, Detroit, Mich., assignor to Lock Thread Corporation, Detroit, Mich., a corporation of Delaware
Continuation-in-part of applications Ser. No. 823,739, June 29, 1959; Ser. No. 139,748, Sept. 21, 1961; Ser. No. 227,301, Oct. 1, 1962; and Ser. No. 465,213, June 18, 1965. This application Apr. 22, 1966, Ser. No. 544,616
5 Claims. (Cl. 151—22)

This application is a continuation-in-part of co-pending applications Ser. No. 823,739 filed June 29, 1959, now abandoned, Ser. No. 139,748 filed Sept. 21, 1961, now abandoned, Ser. No. 227,301 filed Oct. 1, 1962, now Patent No. 3,247,877 and Ser. No. 465,213, filed June 18, 1965, now Patent No. 3,353,581. The invention relates generally to fasteners and refers more particularly to threaded lock fasteners.

It is desirable in lock bolting practice to keep the assembly drag torque low, without unduly sacrificing effective locking action, in order to utilize more of the turning effort to develop a high tension in the threaded member when fully installed. It is also important to maintain a narrow assembly torque range so that tension developed in seating will be more uniform and hence more effective and predictable. In my earlier Patent No. 2,437,638, I disclosed a thread locking action dependent upon interference between the minor diameter (thread crest) of a tapped hole and the minor diameter (thread root) of the screw. Unfortunately, however, it proved necessary in practice to maintain a very close control on the minor diameter of the tapped hole in order to keep the assembly drag torque low and within a narrow range. While the thread lock in my prior patent has gained fair acceptance, the close tolerance requirements have been the main barrier to more widespread use.

One of the essential objects of this invention is to provide a threaded fastener having a self-locking character capability of assuring a permanent locking effect, more uniform tensile loading and greater strength.

Another object of this invention is to provide an improved male fastener having in interference thread lock which will permit the use of wider minor diameter and other tolerances on the internal and external thread. This is of course desirable in that less cost will be involved in the machining of the internal thread, standard internal thread gauging will be permitted, and my improved male fastener can generally be substituted in a standard tapped hole without modification of the hole.

Another object of the invention is to provide an interference thread lock in which the level and range of assembly drag torque are reduced. As a result, greater clamping loads, that is higher bolt tension can be achieved, and such clamping loads and tensioning will be more accurate and predictable; fasteners can be assembled faster and with less effort thereby lowering operator fatigue; smaller power assembly tools may be employed; and the assembly tool is less likely to cam out of a slotted socket set screw or to break the slot.

Another object of the invention is to provide a male fastener designed for root interference with the crest of an internal thread in which the root diameter may be increased without objectionably increasing assembly drag torque, thereby increasing the strength of the fastener, far in excess of any current fastener now in use.

Another object is to provide a fastener which may be used as a chipless self-tapping, self-locking internal cold thread forming fastener. Specifically, this is accomplished by a lobed thread form in which the lobes are spaced circumferentially. Lobe root contact provides self-centering of the fastener or screw upon entry into a drilled hole and, accordingly, it turns in more nearly perpendicular without special guidance.

Another object is to provide a thread locking screw of the self-tapping type which will produce an improved internal thread free of roughness, overlaps, and seams.

Another object is to provide a thread locking screw of the self-tapping type which will produce a stronger thread assembly, particularly the internal thread, because of an improved compacting and cold working of the thread material.

Another object is to provide a chipless self-tapping screw which can be easily manufactured.

Another object is to provide a lock-nut having a continuous internal thread the crest radius of which is non-uniform so that when engaged with a bolt the crest of the nut thread can have an interrupted friction locking engagement with the root of the bolt thread and the thread flanks can be in continuous engagement.

Another object is to provide engaging threaded male and female members wherein the female member has a continuous internal thread of non-uniform crest radius, and the male member has a continuous external thread of uniform root radius between the minimum and maximum crest radius of the internal thread of the female member for interrupted friction locking engagement therewith.

Another object is to provide engaging threaded male and female members wherein the crest-root friction locking engagement is uniform.

Another object is to provide engaging threaded male and female members wherein the crest-root friction locking engagement at the interrupted areas of engagement is a maximum at the mid-point of the areas and progressively less to either side thereof.

Another object of this invention is to provide a fastener having integral circumferential resilient beam segments to improve the locking action.

Other objects and features of the invention will become apparent as the description proceeds, especially when taken in conjunction with the accompanying drawings, wherein:

FIGURE 9 is a plan view of a nut blank prior to the formation of threads therein.

FIGURE 10 is a plan view of the nut after the formation of threads therein.

FIGURE 11 is a sectional view taken on the line 11—11 of FIGURE 10.

FIGURE 12 is a sectional view taken on the line 12—12 of FIGURE 10, showing a bolt threadedly engaged in the nut.

FIGURE 13 is an enlarged fragmentary section illustrating the interfering crest-root engagement of the nut and bolt threads at the left in FIGURE 12.

FIGURE 14 is an enlarged fragmentary cross-section illustrating the non-interfering engagement of the nut and bolt thread at the right in FIGURE 12.

FIGURE 15 illustrates in cross-section a punch which may be employed to form the aperture in the nut blank of FIGURE 9, the punch being shown enlarged.

Figure 1:
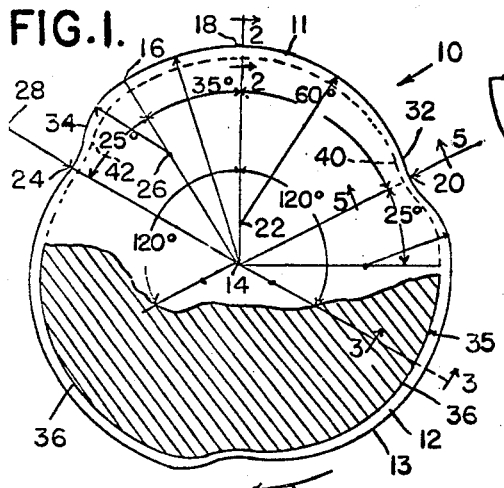
FIGURE 1 is an end view, partly in section, of a screw which can be used as a self-tapping screw in a drilled hole or as an improved lock thread in a pre-tapped hole embodying my invention.

Referring now more particularly to the drawings and especially to FIGURES 1–5, the screw 10 has a continuous spiral external thread 12 of the irregular lobe form shown. The screw thread is formed by any suitable means such, for example, as rolling dies, from an elongated blank having the lobe form or outline of the thread crest 13 indicated in FIGURE 1 throughout substantially its entire length.

The center of the screw, and of the blank from which it is formed, is indicated at 14, and the portion of one thread crest lobe 11 between points 16 and 18 is an arc of approximately 35° with its center at 14. The portion of the thread crest lobe between points 18 and 20 is an arc of approximately 60° formed on a radius centered at 22. That portion of the thread crest lobe between points 16 and 24 is a compound arc, one part being forward on a radius centered at 26 and the other being formed on a radius centered at 28. These parts of the compound arc merge smoothly with each other as shown, and with the portions of the crest form on either side. Each convolution of the thread crest has the lobe form described above, and each lobe 11 is the same. While screw 10 has three lobes, in accordance with the preferred construction, the number of lobes may be two or more than three. Three or more lobes are preferred for better piloting when screwing into a drilled hole. Assuming the screw is threaded into a hole by clockwise rotation, indicated by arrow 30, the portion 32 of each lobe crest will be the leading portion, and the portion 34 thereof the trailing portion. The leading portion curves inward toward the screw axis, but less abruptly than the trailing portion.

The thread root 35 follows the outline in FIGURE 1, and it will be noted that this outline corresponds roughly to the crest outline so that where the crest bulges outward in a lobe form the root does also to a degree. While the thread outline is preferably as shown, it may vary somewhat, depending on the form of the blank and on production methods. As shown, the thread is not uniform in depth; that is, the thread has a relatively deep flank dimension in the lobes and a relatively shallow flank dimension between the lobes. Nevertheless, the root, like the crest, is of generally lobe form having the lobes 36 where the crest is lobed and being relieved or of reduced radius between the lobes where the crest is of reduced radius. The leading portion of the root is indicated at 40 and the trailing portion at 42, and it will be noted that the leading portion curves inward toward the screw axis less abruptly than the trailing portion, as was true of the leading and trailing portions of the crest. Each convolution of the thread root has the lobe form shown in FIGURE 1, and each lobe 36 is the same.

Figure 2:
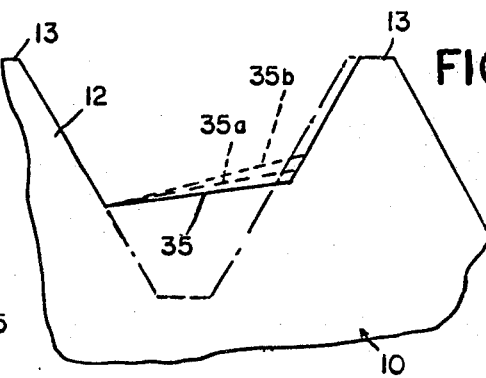
FIGURE 2 is a diagrammatic view illustrating the thread contour at section 2—2 of FIGURE 1, and also showing superimposed thereon the basic or standard American National thread form.

FIGURE 2 is a diagrammatic view illustrating the thread contour at the mid-point of a lobe. The flanks are of generally 60° form, and the root 35 is rather wide, being straight in axial section and inclined with respect to the screw axis at an angle of 6°. If desired, the root may be tapered at a steeper angle, for example 10° or 15° as indicated in dotted lines at 35a and 35b. The inclination of the root is uniform throughout the length of the thread. The root diverges in a direction away from the direction of load. For comparison purposes, the standard American National thread is shown in dot and dash lines in FIGURE 2.

Figure 3:
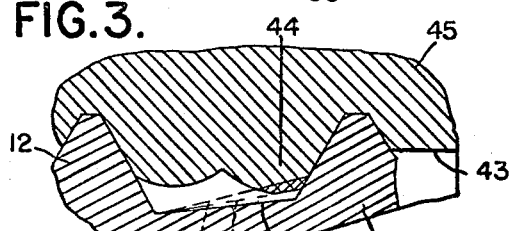
FIGURE 3 is a sectional view taken on the line 3—3 of FIGURE 1, showing the fastener assembled in a drilled hole in which is has formed an internal thread.

The screw 10 is designed to be a self-tapping screw and is shown in FIGURE 3 screwed into a drilled hole 43 in a female member 45. FIGURE 3 shows the screw in a somewhat larger hole than FIGURE 4 and it will be noted that the material displaced by the screw threads moves radially inward toward the screw root to form the internal thread 44. The leading ends 32 and 40 of the crest and root of the screw thread have a very gentle radially inward taper facilitating the entry of the screw into the drilled hole and the displacement of material.

The material displaced may or may not contact the screw thread root, depending upon the size of the drilled hole. If the hole is relatively large, there may be no root contact even at the root lobes, as indicated by the 6° root 35 in FIGURE 3. Under these circumstances there will be no root interference. However, there will be substantial resistance to withdrawal of the fastener by reason of the abrupt angle of the trailing portion 34 of the thread. After the screw is assembled, displaced metal will tend to return behind the thread lobes and to lock in back of the trailing thread portions 34, offering substantial resistance to the withdrawal of the fastener.

Additional resistance to withdrawal of the fastener will be encountered if root interference is present at the lobes. FIGURE 3 indicates root interference at the 10° root 35a and even greater interference at the 15° root 35b, such interference being shown by double hatching. Root interference is desirable in that it will resist withdrawal of the screw, and of course the abrupt trailing portion of the root will further resist withdrawal by reason of the partial return flow of displaced metal in back of the root trailing portion.

Figure 4:
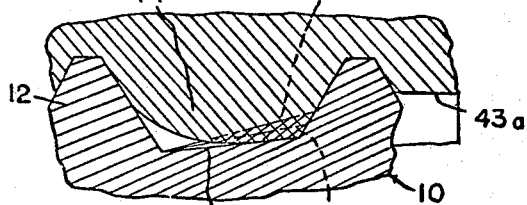
FIGURE 4 is similar to FIGURE 3 but shows the fastener assembled in a drilled hole of slightly smaller diameter than the hole in FIGURE 3.

FIGURE 4 shows the same screw in a somewhat smaller drilled hole 43a in which there is increased root interference at the lobes. Interference exists even at the smaller 6° root taper. While a void is shown between the root of the screw thread and the crest of the internal thread, this space may in most instances be entirely filled by the extruded internal thread, resulting in higher assembly torque.

Figure 5:
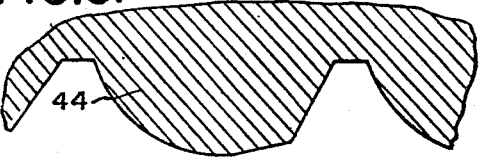
FIGURE 5 is similar to FIGURES 3 and 4, but is taken on the line 5—5 of FIGURE 1.

FIGURE 5 illustrates the thread relationship between lobes. The hole in FIGURE 5 may be considered that of FIGURE 4. It will be seen that there are substantial relieved areas between both flanks and also between the roots. The internal thread in FIGURE 5 has the configuration imparted to it by the lobes of the screw.

Whether or not there is root interference, the screw 10 is particularly well adapted for self-tapping by reason of the gentle radially inward taper at 32 of the leading end of the thread crest which facilitates assembly. Moreover, the more abrupt trailing portion of the thread crest provides a substantially greater resistance to withdrawal. Of course where there is root interference the resistance to withdrawal is increased. While the assembly drag torque is also increased, this increase is not a serious factor because the interference is relieved between the lobes as shown in FIGURE 5, reducing band pressure. The root interference is concentrated at the lobes and is relieved between the lobes. Such interference is a maximum at the lobes and diminishes toward the reliefs. While FIGURE 5 shows a void at the root in the thread region between the lobes there may actually be some root interference which at least would be reduced or relieved with respect to that interference occurring at the lobes because of the reduced root radius between the lobes.

The fastener 10 may also be screwed into a pre-tapped hole in which the minor diameter of the internal thread is dimensioned for interference with at least a portion of the root lobes of the fastener. FIGURES 4 and 5 may be considered as a showing of the fastener in a pre-tapped hole and it will be noted that there is interference at the lobes of the external thread root. There may or may not be flank voids for the accommodation of displaced metal. Even without flank voids at the lobes, there is sufficient void space at the bottom of the root, FIGURE 4, together with the void space between the lobes to accommodate the flow of displaced metal. While there is no root contact shown in FIGURE 5, there may actually be a degree of root contact which would, as previously noted, provide much less interference than at the lobes. The interference is a maximum at the lobes and diminishes progressively therefrom.

As pointed out above, the root interference in connection with the use of the thread lock shown in my prior patent was apt to produce too high a level and too wide a range of assembly drag torque unless the diameter of the tapped hole was closely controlled. By reason of the relieved root interference resulting from the lobed thread form of the fastener 10, an acceptable level and range of assembly drag torque can be had even though the tolerance on the tapped hole is not closely controlled. This is due primarily to the lobed root form which provides interference relief between lobes.

Any desired starting thread for the self-tapping and other fasteners can be provided by using a conventional gimlet point of the same depth and thread form as on the body of the part; that is, merely point the end to the desired outside diameter and root size (see Evans Patent 2,556,174).

A short flank, FIGURE 4, on the screw thread prevents the fastener from pulling out in shear. While this flank is not large and in fact may disappear between lobes, FIGURE 5, it is sufficient for the purpose. The taper on the screw thread root provides a wedging action where interference occurs, further resisting pulling out of the screw.

While it was mentioned that FIGURE 4 might be considered as a section at the lobe of screw 10 in a pre-tapped hole, actually FIGURE 7, described hereinafter, is a better illustration of the thread relationship, and may be considered as such, because it shows flank clearance to receive displaced metal.

Figure 6:
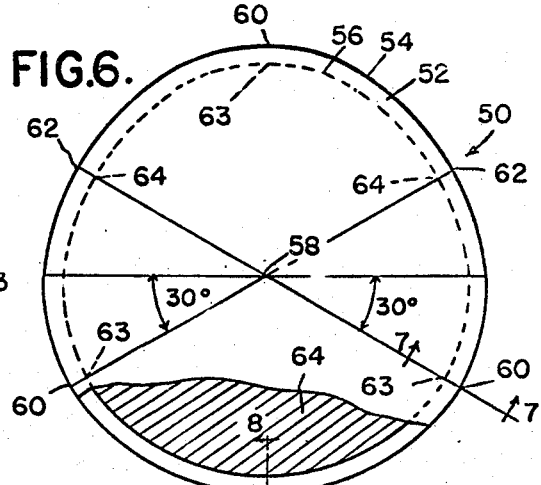
FIGURE 6 is an end view, partly in section, of another fastener embodying my invention.
Figure 7:
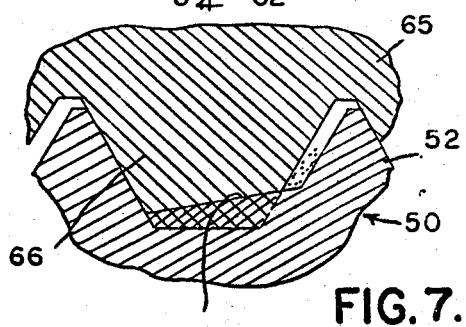
FIGURE 7 is a sectional view taken on the line 7—7 of FIGURE 6 showing the high point of the fastener in a pre-tapped hole.
Figure 8:
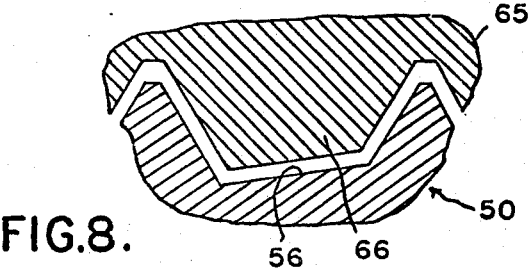
FIGURE 8 is a sectional view taken on the line 8—8 of FIGURE 6 showing the low point of the fastener in a pre-tapped hole.

FIGURES 6-8 illustrate another form of the invention. The fastener 50 there shown is primarily designed to thread into a pre-tapped hole, although it may be used as a self-tapping fastener. The fastener 50 has a continuous spiral external thread 52 which is of uniform size and shape, that is the thread form will appear the same in section no matter where the section is taken (see FIGURES 7 and 8). The thread crest is indicated at 54 and root at 56, and these will be seen to be non-circular, although the dimension across the crest (or root) taken at any angle through the center of the fastener is the same, or at least substantially so.

The screw is formed from a blank whose center corresponds with the center 58 of the screw and whose external surface outline corresponds to the thread crest outline in FIGURE 6. The cross-sectional shape of the blank is the same throughout substantially its full length. This outline, as shown, is non-circular, although the distance across the blank measured at any angle through the center thereof is the same. The blank has three lobes; that is, three points which are of maximum distance from the center 58, and three reliefs between the lobes which are of minimum distance from the blank center. The lobes are at the points 60, while the reliefs are at the intermediate points 62.

The thread is formed on the blank by any suitable means such, for example, as by thread rolling dies, and as stated the thread outline and depth is uniform throughout. The thread crest has lobes at the points 60 of maximum radius from the center, and crest reliefs at the points 62 between the lobes. The thread root has lobes 63 and reliefs 64 which occur at the same points as the crest lobes and reliefs.

The thread flanks are of generally 60° form, and the root 56 is rather wide, being straight in axial section and may be inclined with respect to the screw axis. Any angle may be employed although the angles of 6°, 10° and 15° shown in connection with screw 10 are preferred. The root diverges in a direction away from the load.

FIGURE 7 shows the thread relationship when the fastener is threaded into a pre-tapped hole in a female member 65, the section being taken through a lobe of the thread. It will be noted that there is substantial root interference and along one flank there is a void for the accommodation of displaced metal indicated by dots. When threading into a tapped hole, the displacement of metal is radially outward with respect to the fastener.

FIGURE 8 illustrates the thread relationship in the relief areas of the fastener thread, and it will be noted that there are relieved areas at the root and also along both flanks of the fastener thread. These relieved areas, particularly along the right flank, will accommodate displaced material. It will be noted that the crest of the internal thread 66 has been cold worked and compacted by the root of the preceding lobe (FIG. 8) so that it has generally the same taper as the root of the screw. The original shape of the internal thread is indicated in FIGURE 7. It will be understood, of course, that in some instances there may be no void at the root even in the regions of relief. Nevertheless, the interference will at least be relieved at these points. In any event, there is maximum interference midway between the points of relief, that is at lobes 63, diminishing progressively in both directions.

Since the root interference is at least partially relieved at circumferentially spaced points, the assembly drag torque, as well as band pressure, is substantially lower than for a fastener of the type shown in my prior patent. Moreover, the improved fastener of FIGURES 6-8 permits the tapped hole to have its crest formed within a wider tolerance range without unduly affecting the level or range of assembly drag torque. The same is true of the fastener of FIGURES 1-5 when screwed into a tapped hole.

FIGURES 9-15 show a modification of the invention in which relief is provided on the crest of the nut threads.

Referring to FIGURE 9, the hexagonal nut blank 110 is formed with a generally triangular central perforation 112, the longitudinal elements of the surface of which all are straight and parallel to the central axis 114 in the nut.

The perforation 112 may be formed by a suitable punch 116, FIGURE 15, having a cross-section identical to the aperture 112 in the nut blank 110. This punch may be formed from an initial cylindrical blank 118 in a form grinding machine. The initial cylindrical blank has a radius R. The radial construction lines 120, 122 and 124 are spaced angularly from one another 120 degrees and on these lines are the centers 126, 128 and 130 spaced equal distances from the axis 132 of the cylindrical blank 118. The lands 134, 136 and 138 of the tool formed from the cylindrical blank are arcuate surfaces of radius R', the centers of which are respectively located at 126, 128 and 130. The corners or lobes 140, 142 and 144 of the tool are arcuate surfaces the centers of which are respectively at points 146, 148 and 150 on the lines 120, 122 and 124. The arcuate lobes are of a radius r selected to blend or merge tangentially with the lands on either side thereof. The longitudinal elements of the surface of the tool are straight and parallel to the central longitudinal axis 132.

Upon removal of the surface stock of the cylindrical blank shown in section in FIGURE 15, the tri-lobe tool or punch 116 is obtained which, when axially aligned with the nut blank in FIGURE 9, is advanced to form the aperture 112 therein.

The lands and lobes (or flutes) of aperture 112 in FIGURE 9, and centers from which such lands and lobes are formed, have been given the same characters of reference as the corresponding lands, lobes, and centers of the tool 116 in FIGURE 15. While the radius of curvature r of the lobes or flutes 140, 142 and 144 is smaller than the radius of curvature R' of lands 134, 136 and 138, the lobes or flutes may be considered to be of larger radius than the lands in the sense that they are farther from the center or central axis 114 of the aperture.

After the aperture 112 has been formed in the nut blank, it is threaded by a suitable tap which forms a single continuous internal spiral thread in the aperture, the thread being designated 152 in FIGURE 10. The radius of the root 154 of the thread is uniform throughout the length of the thread so that an axial projection of the thread is a cylinder whose center coincides with the center 114 of the aperture 112 in the nut blank, as seen in FIGURE 10. The tap may be a standard tap so that it does not alter the crest diameter of the threads from that initially established by the punch 116. In other words, the lands and lobes formed by the perforating tool define and determine the thread crest 155 which, as seen in FIGURE 10, is of varying radius. The crest 155, in axial section, is straight and parallel to the nut axis 114. The thread flanks are tapered and uniform in radius throughout their circumferential extent.

The thread thus formed is a continuous thread which is of full depth at the center of the lands 134, 136 and 138 and which is of gradually decreasing depth in either direction therefrom, reaching a minimum depth (or maximum relief) at the centers of the flutes or lobes 140, 142 and 144.

A bolt 160 has a continuous thread 162 adapted to mate with the thread 152 of the nut. The crest radius and the root radius of thread 162 are uniform throughout the length thereof. The axial projection of the crest 164 defines a cylinder concentric with the central axis of the bolt. The root 166 may likewise, if desired, have a cylindrical axial projection concentric with the bolt axis, or it may be tapered up to 15° and preferably about 6°. The uniform root radius of the bolt thread 162 is between the minimum and maximum crest radius of the internal thread of the nut; that is, it is greater than the distance from the axis 114 of the perforation in the nut to the centers of the lands 134, 136 or 138, but less than the distance from the axis 114 to the centers of a lobe 140, 142 or 144. The thread flanks of the bolt are tapered and uniform in radius throughout their circumferential extent.

When the bolt is threaded into the nut as in FIGURE 12, the bolt thread root will have an interfering fit with the crest of the nut thread, causing compression of the interfering material. Interference is a maximum at the centers of the lands 134, 136 and 138 and diminishes progressively to either side of the centers thereof, and the root of the bolt thread will be free of engagement of the crest of the nut threads at the lobes of flutes 140, 142 and 144 thereof. This can be seen in FIGURES 13 and 14. FIGURE 13 shows the interfering fit at the center of a land, and FIGURE 14 shows the relief 167 between the crest and the root of the engaging threads at the center of a lobe. The interfering crest-root contact of the threads at angularly spaced points produces a friction lock. The crest of the nut thread and the root of the bolt thread are of substantial width to provide broad load-bearing surfaces. The relieved spaces 167 provide for even distribution of lubricant between the threads. They also collect any foreign particles which might otherwise be rolled between the mating thread surfaces which could cause galling.

The pitch diameter of the nut 110 is tapped sufficiently high to avoid flank interference with the bolt. Referring to FIGURES 12, 13 and 14, while there is shown a continuous flank engagement 170 of the threads along one side thereof, there is a continuous flank relief or clearance 172 along the other side. Flank relief at 172 is desirable because it reduces running torque—that torque required to run the nut on the bolt—and also because it provides a space into which the interfering material can be displaced.

There is dotted in FIGURE 10 the axial projection of the thread root 166 of the bolt. This will illustrate the amount of interference between the bolt thread root and the nut thread crest and will illustrate also the maximum interference at the center of the lands 134, 136 and 138 forming the nut thread crests, which interference diminishes progressively to either side of the center.

The nut 110 is formed of metal or any other suitable flexible, resilient material, and the radial thickness of the nut is least at the center of the lobes. Hence the circumferential portions of the nut extending from the center of each lobe to the centers of the adjacent lobes are resilient deflecting beams. The interference between the crest of the nut thread and the root of the bolt thread is a maximum at centers of the lands, and hence the resilient deflecting beam portions of the nut can expand. The portions of the nut at the centers of the lands move radially outwardly, and the portions at the centers of the lobes move radially inwardly.

The nut aperture has five flutes or lobes or less, and preferably three (tri-lobe), as shown. One advantage of a 3-fluted nut is better centering of the thread forming tap. Another advantage of a 3-fluted nut is that equal distribution of the pressure areas assures centralization of the bolt engaged therein, and a corresponding equalization of the resulting drag torque. However, a two-lobe aperture, or one with more than three, four or five lobes, is feasible. It is obvious that the deflecting beams of a two-lobe aperture would be longer than those of an aperture with three lobes or flutes.

It will be appreciated that for the nut and bolt of FIGURE 12 there is 360° of thread flank loading engagement at 170, i.e., flank pressure loading completely around the bolt to resist loosening due to vibrations under load. Moreover, the bolt is centered and pressure on the bolt is equalized due to the location of the pressure areas at equally spaced areas around the bolt. The full flank engagement of the threads also provides a maximum shear resistance to stripping.

As stated, there will be interference between the root of the bolt 160 and the circumferentially spaced lands of the thread crest of the nut 110 (FIG. 13), and there will be spaces or voids between the root of the male thread of bolt 160 and the crest of the female thread of nut 110 between the points of maximum interference, that is in the regions of the flutes or lobes 140, 142 and 144. However, while such spaces or voids are preferred, it is in the broader sense only necessary that the interference be relieved at these points.

Preferably the root of the thread of bolt 160 slopes or diverges as shown in a direction away from the direction of load.

The pitch diameter of the nut 110 is preferably sufficiently high to avoid flank interference on bolt 160.

It is desirable and in fact ideal that the flex of the nut, or of the beam sections thereof, when applied to the bolt be held within the elastic limits of the material so that the locking effect will always be the same whenever the nut is applied.

The first contacting thread crests of the nut or roots of the bolt may be reduced by chamfering or otherwise for the purpose of providing starting threads.

What is claimed is:

1. A self-locking male member having a continuous external male thread, a female member formed with an aperture and having a preformed continuous internal female thread mating with said male thread, the root of said male thread extending generally helically but in each of at least several convolutions having a plurality of circumferentially uniformly spaced lands located farther from the axial center of said male member than the intervening portions thereof, said lands and intervening portions being continuous and uninterrupted in axial section and merging and blending smoothly with one another to provide a substantially smooth, gently relieved form throughout the circumferential extent of said lands and intervening portions free of sharp edges and projections, said root of said male thread diverging from the axis of said male member in a direction away from the direction of load, the angle of divergence of said root of said male thread not exceeding approximately 15°, the crest of said female thread extending generally helically and, in those convolutions mating with the aforesaid convolutions of said male thread having an interference with said root of the male thread at said lands but being spaced from said intervening portions whereby to provide relieved areas between said crest and said intervening portions, the root of said male thread in the aforesaid mating convolutions being of substantial width measured axially to provide broad axial-load bearing surfaces engaging the crest of said female thread, said male and female members having limits of size prior to assembly so prescribed as to provide a flank clearance so that in assembly there is space for the receipt of displaced material between one of the flanks of said male thread and the confronting flank of said female thread.

2. Male and female members as defined in claim 1 wherein said root of said male thread diverges from the axis of said male member at an angle of approximately 6°.

3. Male and female members as defined in claim 1, wherein the said one of the flanks of said male thread is the flank at the radially outermost end of the root of said male thread.

4. Male and female members as defined in claim 1, wherein said convolutions each have three equally circumferentially spaced lands, said lands being aligned in three substantially axially extending rows.

5. Male and female members as defined in claim 1, wherein said lands have convex leading ends merging with said intervening portions, the trailing ends of said lands each having a convex part and a concave part in sequence, said concave parts merging into said intervening portions, said leading ends of said lands being of greater circumferential extent than said trailing ends.

References Cited
UNITED STATES PATENTS

| | | | |
|---|---|---|---|
| 1,844,382 | 2/1932 | Dardelet | 151—19 |
| 2,452,192 | 10/1948 | Hosking | 151—21 |
| 2,437,638 | 3/1948 | Evans | 151—22 |
| 2,484,644 | 10/1949 | Poupitch | 151—22 |
| 2,484,645 | 10/1949 | Baumle | 151—22 |
| 2,788,046 | 4/1957 | Rosan | 151—22 |
| 2,991,491 | 7/1961 | Welles | 85—46 |
| 3,104,161 | 9/1963 | Carlson | 85—47 |
| 3,195,156 | 7/1965 | Phipard | 85—47 |
| 3,200,691 | 8/1965 | Neuschotz | 85—47 |
| 3,226,743 | 1/1966 | Watkins | 10—152 |

MARION PARSONS, JR., *Primary Examiner.*